(12) United States Patent
Balasubramanian et al.

(10) Patent No.: US 8,041,705 B2
(45) Date of Patent: *Oct. 18, 2011

(54) MICROHUBS AND ITS APPLICATIONS

(75) Inventors: Srinivasan Balasubramanian, San Jose, CA (US); Michael Ching, San Jose, CA (US); Piyoosh Jalan, San Jose, CA (US); Satish C. Penmetsa, Fremont, CA (US); Andrew S. Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 389 days.

This patent is subject to a terminal disclaimer.

(21) Appl. No.: 12/348,336

(22) Filed: Jan. 5, 2009

(65) Prior Publication Data

US 2009/0119291 A1    May 7, 2009

Related U.S. Application Data

(63) Continuation of application No. 11/241,469, filed on Sep. 30, 2005, now Pat. No. 7,496,557.

(51) Int. Cl.
G06F 17/30    (2006.01)

(52) U.S. Cl. .......................... 707/709; 715/205; 715/234

(58) Field of Classification Search .................. 707/709; 715/205, 234

See application file for complete search history.

(56) References Cited

U.S. PATENT DOCUMENTS

| | | | |
|---|---|---|---|
| 6,601,075 B1 * | 7/2003 | Huang et al. ................... | 707/748 |
| 7,496,557 B2 * | 2/2009 | Balasubramanian et al. ........ | 1/1 |
| 2002/0143755 A1 | 10/2002 | Wynblatt et al. | |
| 2003/0005036 A1 | 1/2003 | Mitzenmacher | |
| 2005/0033803 A1 | 2/2005 | Vleet et al. | |
| 2005/0171946 A1 * | 8/2005 | Maim ............................... | 707/5 |

* cited by examiner

*Primary Examiner* — Cheryl Lewis
(74) *Attorney, Agent, or Firm* — Gibb I.P. Law Firm, LLC

(57) ABSTRACT

A system and method of crawling at least one website comprising at least one URL includes maintaining a lookup structure comprising all of the URLs known to be on a website; calculating a hub score for each webpage of the website to be recrawled, wherein the hub score measures how likely the to be recrawled webpage includes links to fresh content published on the website; sorting all the to be recrawled pages by their hub scores; and crawling the to be recrawled pages in order from highest hub scores to lowest hub scores. The calculating comprises computing a first value equaling a percentage of a number of new relative URLs on the to be recrawled page; computing a second value equaling a percentage of a previous hub score of the to be recrawled page; and computing the hub score as a sum of the first and the second values.

18 Claims, 3 Drawing Sheets

MICROHUBS AND ITS APPLICATIONS

CROSS-REFERENCE TO RELATED APPLICATIONS

This application is a Continuation of U.S. application Ser. No. 11/241,469, U.S. Pat. No. 7,496,557, filed Sep. 30, 2005, the complete disclosure of which, in its entirety, is herein incorporated by reference.

BACKGROUND

1. Field of the Invention

The embodiments of the invention generally relate to web searching, and, more particularly, to microhubs used for web searching.

2. Description of the Related Art

Often in web crawling, many irrelevant and unimportant websites are discovered during the course of searching websites. Therefore, there remains a need for a novel web crawling technique which reduces the amount of irrelevant websites which are discovered during web crawling.

SUMMARY

In view of the foregoing, the embodiments of the invention provide a method of crawling at least one website comprising at least one universal resource locator (URL), and a program storage device readable by computer, tangibly embodying a program of instructions executable by the computer to perform the method of crawling at least one website comprising at least one URL, wherein the method comprises maintaining a lookup structure comprising all of the URLs known to be on a website; calculating a hub score for each webpage of the website to be recrawled, wherein the hub score measures how likely the to be recrawled webpage includes links to fresh content published on the website; sorting all the to be recrawled pages by their hub scores; and crawling the to be recrawled pages in an order from highest hub scores to lowest hub scores.

Preferably, the calculating process comprises computing a first value, wherein the first value equals a percentage of a number of new relative URLs on the to be recrawled page; computing a second value, wherein the second value equals a percentage of a previous hub score of the to be recrawled page; and computing the hub score as a sum of the first value and the second value. The method may further comprise updating the hub score by combining a history of the hub scores in a current hub score calculation. Moreover, the crawling process is preferably performed by a crawler, and wherein the crawler is preferably adapted to maintain the lookup structure including a history of all URLs familiar to the crawler; compare crawled URLs with the history; and compute the hub score based on newly discovered URLs unlisted in the history.

Additionally, when the crawler selects the newly discovered URLs to crawl, the crawler is preferably adapted to sort eligible URLs by a date of creation within an immediate previous 24 hour period. Furthermore, the method may comprise recording heuristic information when an URL is created, wherein the crawler assigns a creation date and records a last crawled date of a discoverer of the newly discovered URL.

Another embodiment of the invention provides a system of crawling at least one website comprising at least one URL, wherein the system comprises a lookup structure comprising all of the URLs known to be on a website; a calculator adapted to calculate a hub score for each webpage of the website to be recrawled, wherein the hub score measures how likely the to be recrawled webpage includes links to fresh content published on the website; a sorter adapted to sort all the to be recrawled pages by their hub scores; and a crawler adapted to crawl the to be recrawled pages in an order from highest hub scores to lowest hub scores. Preferably, the calculator comprises a first processor adapted to compute a first value, wherein the first value equals a percentage of a number of new relative URLs on the to be recrawled page; a second processor adapted to compute a second value, wherein the second value equals a percentage of a previous hub score of the to be recrawled page; and a third processor adapted to compute the hub score as a sum of the first value and the second value.

The system may further comprise a mechanism adapted to update the hub score by combining a history of the hub scores in a current hub score calculation. Additionally, the crawler is preferably adapted to maintain the lookup structure including a history of all URLs familiar to the crawler; compare crawled URLs with the history; and compute the hub score based on newly discovered URLs unlisted in the history. Preferably, when the crawler is adapted to select the newly discovered URLs to crawl, the crawler is adapted to sort eligible URLs by a date of creation within an immediate previous 24 hour period. Moreover, the system may further comprise a storage unit adapted to record heuristic information when an URL is created, wherein the crawler assigns a creation date and records a last crawled date of a discoverer of the newly discovered URL.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
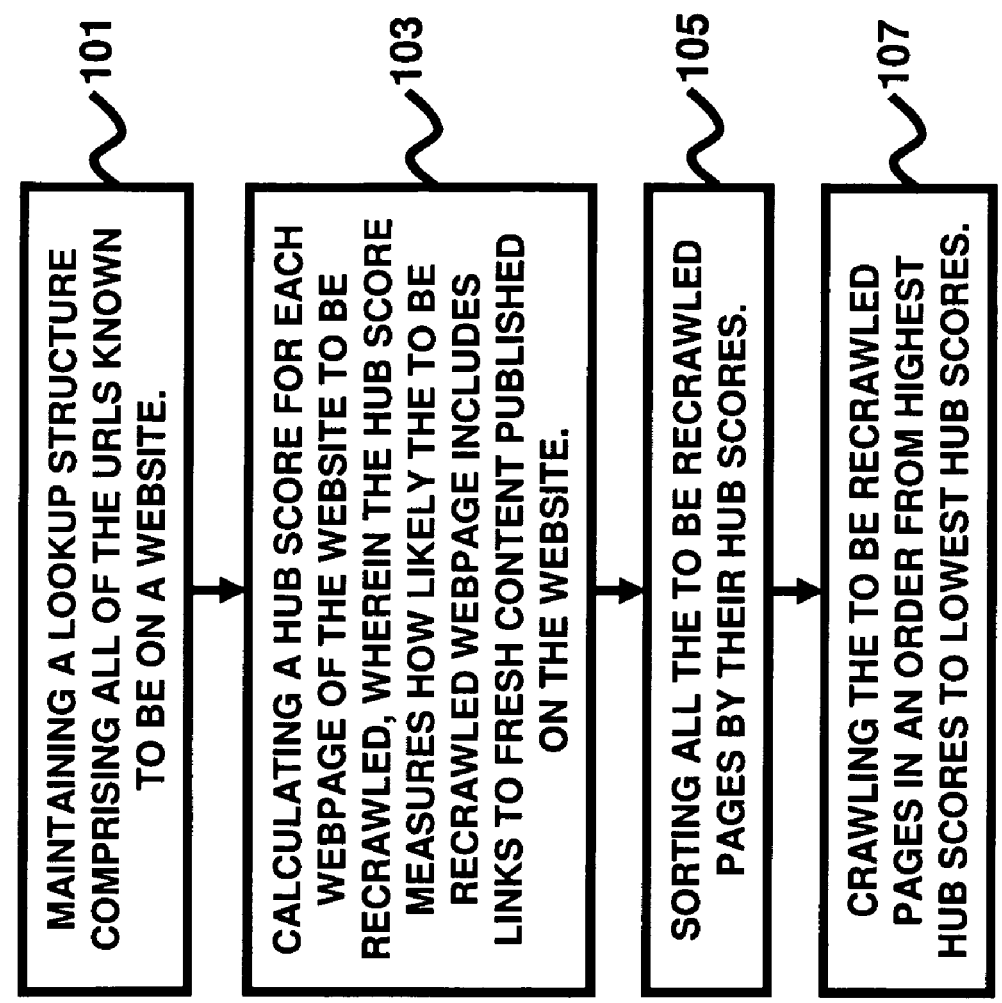
FIG. 1 is a flow diagram illustrating a preferred method according to an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Figure 2:
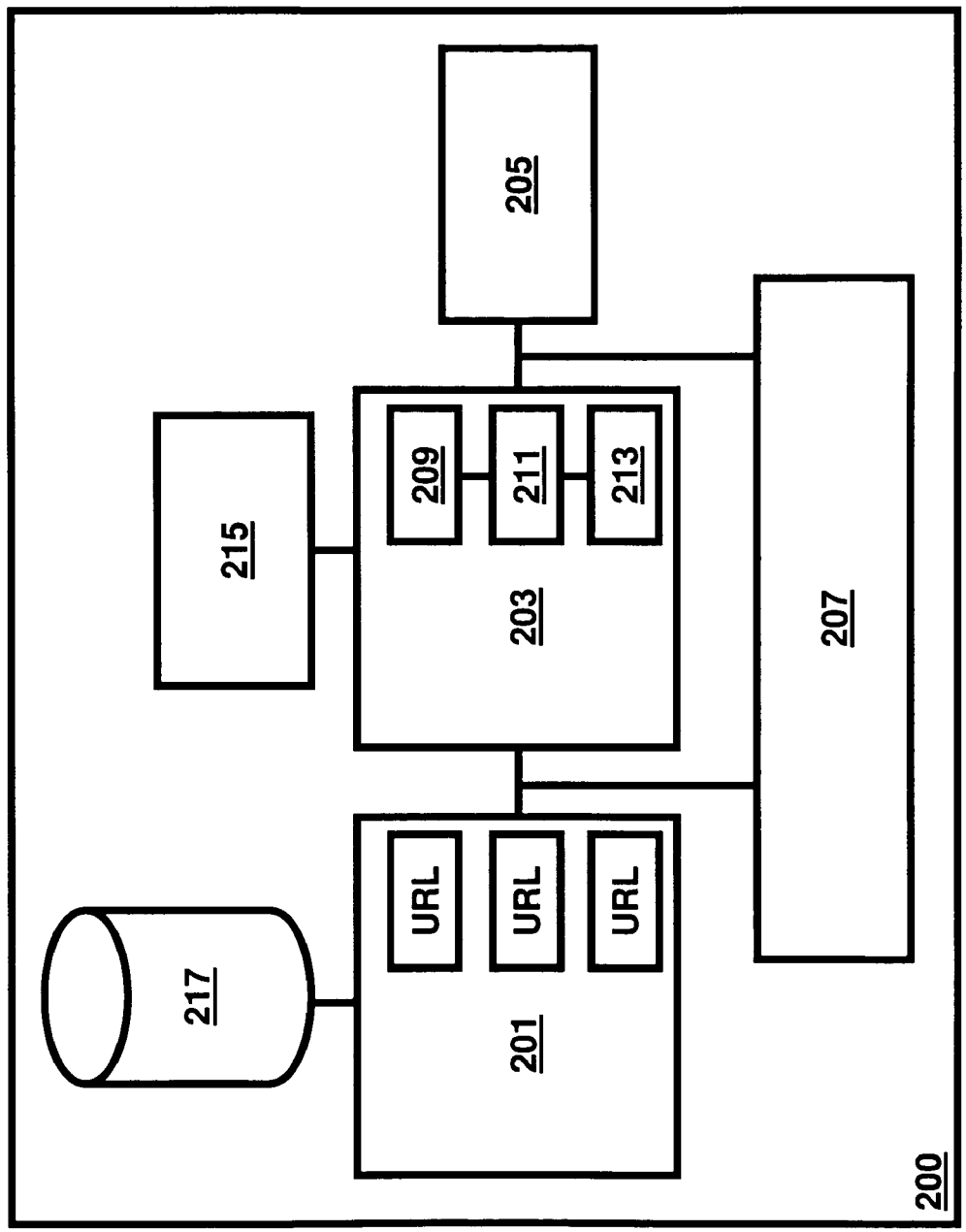
FIG. 2 illustrates a system diagram according to an embodiment of the invention.
Figure 3:
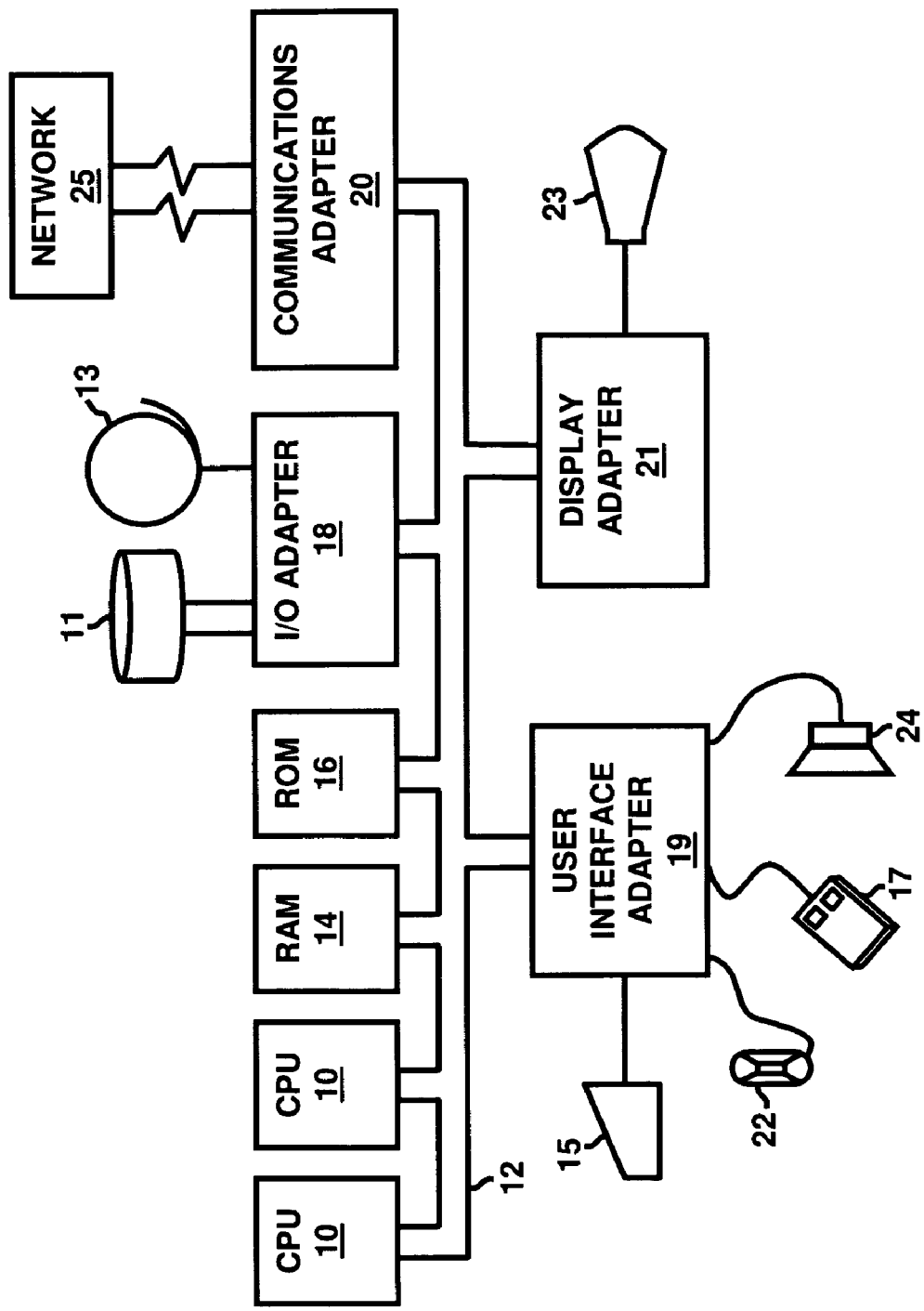
FIG. 3 illustrates a computer architecture diagram according to an embodiment of the invention.

As mentioned, there remains a need for a novel web crawling technique which reduces the amount of irrelevant websites which are discovered during web crawling. The embodiments of the invention achieve this by providing a web crawling technique that utilizes hub scores to determine the order in which web pages are selected. Referring now to the drawings, and more particularly to FIGS. 1 through 3, there are shown preferred embodiments of the invention.

FIG. 1 illustrates a flow diagram of a method of crawling at least one website comprising at least one URL, wherein the method comprises maintaining (101) a lookup structure comprising all of the URLs known to be on a website; calculating (103) a hub score for each webpage of the website to be recrawled, wherein the hub score measures how likely the to be recrawled webpage includes links to fresh content published on the website; sorting (105) all the to be recrawled pages by their hub scores; and crawling (107) the to be recrawled pages in an order from highest hub scores to lowest hub scores.

Preferably, the calculating process (103) comprises computing a first value, wherein the first value equals a percentage of a number of new relative URLs on the to be recrawled page; computing a second value, wherein the second value equals a percentage of a previous hub score of the to be recrawled page; and computing the hub score as a sum of the first value and the second value. The method may further comprise updating the hub score by combining a history of the hub scores in a current hub score calculation. Moreover, the crawling process (107) is preferably performed by a crawler, and wherein the crawler is preferably adapted to maintain the lookup structure including a history of all URLs familiar to the crawler; compare crawled URLs with the history; and compute the hub score based on newly discovered URLs unlisted in the history.

Additionally, when the crawler selects the newly discovered URLs to crawl, the crawler is preferably adapted to sort eligible URLs by a date of creation. For example, retrieve all URLs discovered within the last (previous) 24 hour period. Furthermore, the method may comprise recording heuristic information when an URL is created, wherein the crawler assigns a creation date and records a last crawled date of a discoverer of the newly discovered URL.

Microhubs may be thought of as important links in a website, which leads to the discovery of the remaining universal resource locators (URLs) belonging to a website. Hereinafter, the term "hub" and "microhub" are used interchangeably. Microhubs can be active or passive. Active microhubs include links to newly authored content and are rapidly changing while passive microhubs include relatively old information and do not change as often as active microhubs.

For example, the first page in a newspaper website can be thought of as an active hub, since it includes links to headline stories (fresh content). Archive pages containing links to old stories are examples of passive hubs. One property of active microhubs is that the links they hold are transient in nature. Thus, if one were to take a snapshot of a website and perform link analysis, it is very likely that archive pages contain more links than active microhubs.

Active microhubs represent hotspots of change in the web, which hosts link to fresh content published within a website. Accordingly, active microhubs may be very useful in many scenarios. Applications such as buzz or reputation management inherently rely on newly published content and big websites containing millions of URLs generally cannot be crawled in timely fashion because of various types of constraints (i.e., politeness). For these kinds of applications active microhubs present an attractive way to prioritize and crawl the freshly created content. An active microhub score (also referred to herein as "hub score") is a measure of how likely a URL is to contain links to fresh content published in that site. Fresh content is primarily differentiated in terms of how long ago (i.e., timewise) the content was authored. The higher the hub score, the more likely that URL will contain links to fresh content. This score is local to a site and is not a global score across the websites.

In accordance with the embodiments of the invention, the hub score of a webpage is calculated based on the number of new relative URLs discovered when a page is recrawled. In this context, recrawling means crawling the contents of the page once again. The hub score computation comprises two parts. When a page is recrawled the crawler computes a number which is a certain percentage (for example 30 percent) of the number of new relative URLs it discovers off of that link. This number is added to another number which is a corresponding percentage (for example 70 percent) of the previous hub score to compute a new hub score. The values are chosen in such a way to bias pages which continually hosts new content, while allowing for detection of new microhubs in a timely manner. These values can be tuned for various websites. Thus, the hub score can be updated without maintaining historical information; the history is combined in the current hub score. Each time the new hub score is calculated, one may take into account the historical value of the hub score by computing a number which is, for example, 70 percent of the previous hub score.

In other words, mathematically, the hub score=0.7×old hub score+0.3×new relative links. The cost of computing the hub score is minimal since it is easily adaptable within a webcrawler flow. The crawler maintains a lookup structure containing all of the URLs it already knows. Since the webcrawler partitions URLs by site, this lookup structure is guaranteed to include all on-site URLs known to the entire system. Generally, web scale crawlers are run on distributed systems containing many different computers and since the webcrawler partitions URLs by site, a single computer is guaranteed to contain all the URLs it knows from a site. Therefore, it is relatively easy to detect newly discovered URLs and compute the hub score in this environment.

A webcrawler may be constrained by politeness, and there is a limit to how much data can be crawled in a certain time period. Politeness determines how often one can crawl a website without overwhelming the crawled website. There are no hard and fast rules as to how often a webcrawler should crawl a particular website. However, the general rule of thumb is the webcrawler issues crawl requests approximately once every 5 seconds. For large websites comprising millions of URLs it is preferred that the webcrawler prioritize and crawl only important and relevant URLs. Applications such as buzz and reputation management inherently rely on new data. For these applications it is preferred that the webcrawler fetches newly published content before any other document.

One of the primary challenges of the webcrawler is the ability to be able to identify and crawl those websites comprising newly published content, without involving costly analysis. The hub score as provided by the embodiments of the invention is utilized in this context, in that it provides a mechanism to identify pages, which are more likely to contain links to fresh content. A webcrawler may include knobs, which can be used to control the time spent in crawling new pages as opposed to old pages. When selecting old pages to recrawl, the crawler sorts the candidate old pages by hub score and crawls them. Crawling of these hub pages ensures that the URLs containing newly published content are discovered by the crawler. When selecting new URLs to crawl, the crawler sorts the eligible URLs by the date of creation and selects URLs discovered within an immediate previous 24 hour period. This ensures that the crawler crawls the newly published content before crawling other documents.

When a website adds a new section or if it gets reorganized, it could result in the emergence of new active microhubs. Implicit in the discussion is how to deemphasize the scores of old hubs. Based on the above formulae, when a new hub emerges, the scores of the old hub are reduced every time the crawler visits and it discovers that there are no new relative outlinks emerging from it. Because of the above formulae, the hub score of a page is continually reduced to, for example, 70 percent (or whatever the corresponding percentage is calculated to be) of its previous value whenever the crawler revisits (recrawls) an URL.

Determining the approximate date during which a web document was created is a significant piece of information which can be exploited by higher level miners. The crawler records two pieces of information when an URL is created. It assigns a creation date and also records the last crawled date of the discoverer. These two dates are significant heuristics which can be used to find the date in which the page was created. It is likely to satisfy the following inequality: "Discoverer Last crawldate<Date page was published<creationdate".

In this context, "likely to satisfy" is chosen because the page may have appeared earlier, but may have been linked to/from the hub only recently. Due to the nature of active hubs as places where websites publish links to their new content, this is an unlikely scenario, and usually the inequality provides useful bounds on the publication date of a newly-discovered page. This inequality is true even if the hub score is not used, but crawling by the fresh content crawling tends to produce tighter bounds since good hubs are recrawled often, shrinking the distance between the "creationdate" and the discoverer's last "crawldate". Tighter bounds are preferred because it is much more useful to say that a page first appeared on the web within the last 10 days, as opposed to saying that a page appeared within the last 6 months.

The webcrawler also records how far away a URL is from a hub. This, along with hub score and date of page information, can be used as a heuristic for ranking websites in intranet search engines. This does not in itself provide absolute ranks, rather it can be used as an important differentator when ranking pages. As an example, if two pages have the same rank and one of the pages happens to have a recent date of page information, then it is very likely that the user is interested in the recent page. The combination of hostrank along with hub scores can point to hotspots in the web. Here, hostrank determines how important a web site is. It is similar to page rank but is calculated with links that are collapsed at the site level. By sampling these URLs at a predictable interval, one can find out how news spreads across the web. This can occur, for example, once every day.

FIG. 2 illustrates a system diagram according to an embodiment of the invention, wherein the system 200 of crawling at least one website comprising at least one URL comprises a lookup structure 201 comprising all of the URLs known to be on a website; a calculator 203 adapted to calculate a hub score for each webpage of the website to be recrawled, wherein the hub score measures how likely the to be recrawled webpage includes links to fresh content published on the website; a sorter 205 adapted to sort all the to be recrawled pages by their hub scores; and a crawler 207 adapted to crawl the to be recrawled pages in an order from highest hub scores to lowest hub scores.

Preferably, the calculator 203 comprises a first processor 209 adapted to compute a first value, wherein the first value equals a percentage of a number of new relative URLs on the to be recrawled page; a second processor 211 adapted to compute a second value, wherein the second value equals a percentage of a previous hub score of the to be recrawled page; and a third processor 213 adapted to compute the hub score as a sum of the first value and the second value.

The system 200 may further comprise a mechanism 215 adapted to update the hub score by combining a history of the hub scores in a current hub score calculation. Additionally, the crawler 207 is preferably adapted to maintain the lookup structure including a history of all URLs familiar to the crawler 207; compare crawled URLs with the history; and compute the hub score based on newly discovered URLs unlisted in the history. Preferably, when the crawler 207 is adapted to select the newly discovered URLs to crawl, the crawler 207 is adapted to sort eligible URLs by a date of creation within an immediate previous 24 hour period. Moreover, the system 200 may further comprise a storage unit 217 adapted to record heuristic information when an URL is created, wherein the crawler 207 assigns a creation date and records a last crawled date of a discoverer of the newly discovered URL.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of crawling at least one website comprising at least one universal resource locator (URL), said method comprising:
   maintaining a lookup structure comprising all of the URLs known to be on a website;
   calculating a hub score for each webpage of said website to be recrawled, wherein said hub score measures how likely the to be recrawled webpage includes links to fresh content published on said website, wherein said fresh content is differentiated from other content based on how long ago said fresh content was authored;
   sorting all said to be recrawled pages by their hub scores; and
   crawling said to be recrawled pages in an order from highest hub scores to lowest hub scores to crawl said fresh content before crawling relatively older published content.

2. The method according to claim 1, wherein said crawling is performed by a crawler, and wherein said crawler is adapted to maintain said lookup structure including a history of all URLs familiar to said crawler.

3. The method according the claim 2, wherein said crawler is adapted to compare crawled URLs with said history.

4. The method according to claim 3, wherein said crawler is adapted to compute said hub score based on newly discovered URLs unlisted in said history.

5. The method according to claim 4, wherein when said crawler selects said newly discovered URLs to crawl, said crawler being adapted to sort eligible URLs by a date of creation within an immediate previous 24 hour period.

6. The method according to claim 4, further comprising recording heuristic information when an URL is created, wherein said crawler assigns a creation date and records a last crawled date of a discoverer of said newly discovered URL.

7. A program storage device readable by computer, tangibly embodying a program of instructions executable by said computer to perform a method of crawling at least one website comprising at least one universal resource locator (URL), said method comprising:
   maintaining a lookup structure comprising all of the URLs known to be on a website;
   calculating a hub score for each webpage of said website to be recrawled, wherein said hub score measures how likely the to be recrawled webpage includes links to fresh content published on said website, wherein said fresh content is differentiated from other content based on how long ago said fresh content was authored;
   sorting all said to be recrawled pages by their hub scores; and
   crawling said to be recrawled pages in an order from highest hub scores to lowest hub scores to crawl said fresh content before crawling relatively older published content.

8. The program storage device according to claim 7, wherein said crawling is performed by a crawler, and wherein said crawler is adapted to maintain said lookup structure including a history of all URLs familiar to said crawler.

9. The program storage device according to claim 8, wherein said crawler is adapted to compare crawled URLs with said history.

10. The program storage device according to claim 9, wherein said crawler is adapted to compute said hub score based on newly discovered URLs unlisted in said history.

11. The program storage device according to claim 10, wherein said crawler selects said newly discovered URLs to crawl, said crawler being adapted to sort eligible URLs by a date of creation within an immediate previous 24 hour period.

12. The program storage device according to claim 10, further comprises recording heuristic information when an URL is created, wherein said crawler assigns a creation date and records a last crawled date of a discoverer of said newly discovered URL.

13. A system of crawling at least one website comprising at least one universal resource locator (URL), said system comprising:
   a lookup structure comprising all of the URLs known to be on a website;
   a calculator adapted to calculate a hub score for each webpage of said website to be recrawled, wherein said hub score measures how likely the to be recrawled webpage includes links to fresh content published on said website, wherein said fresh content is differentiated from other content based on how long ago said fresh content was authored;
   a sorter adapted to sort all said to be recrawled pages by their hub scores; and
   a crawler adapted to crawl said to be recrawled pages in an order from highest hub scores to lowest hub scores to crawl said fresh content before crawling relatively older published content.

14. The system according to claim 13, wherein said crawler is adapted to maintain said lookup structure including a history of all URLs familiar to said crawler.

15. The system according to claim 14, wherein said crawler is adapted to compare crawled URLs with said history.

16. The system according to claim 15, wherein said crawler is adapted to compute said hub score based on newly discovered URLs unlisted in said history.

17. The system according to claim 16, wherein when said crawler is adapted to select said newly discovered URLs to crawl, said crawler being adapted to sort eligible URLs by a date of creation within an immediate previous 24 hour period.

18. The system according to claim 16, further comprising a storage unit adapted to record heuristic information when an URL is created, wherein said crawler assigns a creation date and records a last crawled date of a discoverer of said newly discovered URL.

* * * * *